United States Patent
Rosepiler et al.

(10) Patent No.: US 9,004,511 B1
(45) Date of Patent: Apr. 14, 2015

(54) STABILIZING BAR MOUNTING STRUCTURE

(71) Applicants: Stephen G. Rosepiler, Marysville, OH (US); Philip S. H. Moir, Dublin, OH (US); Christopher B. Dundon, Marysville, OH (US)

(72) Inventors: Stephen G. Rosepiler, Marysville, OH (US); Philip S. H. Moir, Dublin, OH (US); Christopher B. Dundon, Marysville, OH (US)

(73) Assignee: Honda Motor Co., Ltd., Tokyo (JP)

(*) Notice: Subject to any disclaimer, the term of this patent is extended or adjusted under 35 U.S.C. 154(b) by 80 days.

(21) Appl. No.: 14/049,825

(22) Filed: Oct. 9, 2013

(51) Int. Cl.
B60G 21/055 (2006.01)

(52) U.S. Cl.
CPC .... B60G 21/0551 (2013.01); *B60G 2204/1222* (2013.01); *B60G 2204/122* (2013.01)

(58) Field of Classification Search
CPC ............... B60G 2204/1122; B60G 2204/122; B60G 21/0551
USPC .................................................. 280/124.109
See application file for complete search history.

(56) References Cited

U.S. PATENT DOCUMENTS

| | | | |
|---|---|---|---|
| 4,192,529 A | | 3/1980 | Shiratori et al. |
| 4,249,753 A | * | 2/1981 | Froumajou .................... 280/790 |
| 4,951,962 A | * | 8/1990 | Tomida et al. ......... 280/124.108 |
| 5,707,074 A | * | 1/1998 | Kobayashi ............. 280/124.166 |
| 5,788,264 A | * | 8/1998 | Adkins et al. .......... 280/124.106 |
| 6,045,146 A | * | 4/2000 | Schoen et al. ......... 280/124.166 |
| 6,073,714 A | * | 6/2000 | McHorse et al. .......... 180/89.14 |
| 6,398,451 B1 | * | 6/2002 | Zetterstrom ................... 403/347 |
| 6,494,472 B2 | | 12/2002 | Suzuki |
| 6,588,534 B1 | * | 7/2003 | Daly ............................. 180/300 |
| 6,641,151 B1 | * | 11/2003 | Zetterstrom ........... 280/124.107 |
| 6,733,020 B2 | * | 5/2004 | Reineck ................. 280/124.107 |
| 6,789,812 B2 | * | 9/2004 | Peterson ................ 280/124.152 |
| 6,871,864 B2 | * | 3/2005 | Reineck ................. 280/124.107 |
| 6,877,754 B2 | * | 4/2005 | Kim ....................... 280/124.109 |
| 6,886,840 B2 | * | 5/2005 | Reineck ................. 280/124.107 |
| 6,923,474 B2 | * | 8/2005 | Frasch et al. .................. 280/784 |
| 6,962,229 B2 | | 11/2005 | Miyahara |
| 7,243,932 B2 | | 7/2007 | Kim et al. |
| 7,503,585 B2 | * | 3/2009 | Hashimura et al. ........... 280/782 |
| 7,540,513 B2 | * | 6/2009 | Reineck ................. 280/124.106 |
| 7,637,515 B2 | | 12/2009 | Parisi et al. |
| 7,654,543 B2 | * | 2/2010 | Tanaka et al. ......... 280/124.109 |
| 7,771,137 B2 | * | 8/2010 | Anzai et al. ................. 403/379.3 |
| 7,828,308 B2 | * | 11/2010 | Hansson et al. ....... 280/124.152 |
| 7,845,662 B2 | * | 12/2010 | Ogawa et al. ......... 280/124.109 |
| 7,857,349 B2 | * | 12/2010 | Fujiki et al. .................... 280/785 |
| 7,878,475 B2 | | 2/2011 | Rogers |
| 7,946,602 B2 | * | 5/2011 | Shimatani et al. ..... 280/124.152 |
| 7,967,307 B2 | * | 6/2011 | Reineck ................. 280/124.106 |

(Continued)

FOREIGN PATENT DOCUMENTS

| | | | | |
|---|---|---|---|---|
| DE | 102011002964 | * | 7/2012 | ......... B60G 21/0551 |
| JP | 2001182767 A | | 7/2001 | |

(Continued)

*Primary Examiner* — Nicole Verley
(74) *Attorney, Agent, or Firm* — Fay Sharpe LLP

(57) ABSTRACT

According to a further embodiment, an automotive vehicle including a body frame having opposed side frames and a subframe having opposed side members is disclosed. The subframe includes a stabilizer bar connection assembly comprised of generally U-shaped recess formed in each of the opposed side members and a generally U-shaped bushing disposed within the recesses. The opposed side frames overlie the opposed side members adjacent the recesses and secure the bushings within their respective recess.

20 Claims, 5 Drawing Sheets

(56) References Cited

U.S. PATENT DOCUMENTS

| | | | |
|---|---|---|---|
| 7,976,037 B2 * | 7/2011 | Yoshida et al. | 280/124.109 |
| 8,240,688 B2 | 8/2012 | Mitayamoto | |
| 8,590,910 B2 * | 11/2013 | Suzuki | 280/124.128 |
| 2004/0021285 A1 * | 2/2004 | Frasch et al. | 280/124.109 |
| 2006/0082093 A1 | 4/2006 | Sterly et al. | |
| 2009/0072099 A1 | 3/2009 | Trotter et al. | |
| 2009/0212521 A1 * | 8/2009 | Steffens et al. | 280/124.109 |
| 2010/0032920 A1 * | 2/2010 | Hong | 280/124.109 |
| 2010/0244395 A1 | 9/2010 | Sugiura et al. | |

FOREIGN PATENT DOCUMENTS

| | | |
|---|---|---|
| JP | 2004210262 A | 7/2004 |
| KR | 2001016999 A | 3/2001 |
| WO | 2006008803 A1 | 1/2006 |
| WO | 2009038872 A2 | 3/2009 |
| WO | 2009104815 A1 | 8/2009 |

* cited by examiner

STABILIZING BAR MOUNTING STRUCTURE

BACKGROUND

The present exemplary embodiment relates to a stabilizing bar mounting structure. It finds particular application in conjunction with an automotive vehicle having a subframe, and will be described with particular reference thereto. However, it is to be appreciated that the present exemplary embodiment is also amenable to other like applications.

Generally, the vehicle body construction of a motor vehicle can be broadly divided into framed and frameless construction. In the case of framed vehicles, a chassis part can be attached directly to the body frame, but on some vehicles, it is attached to a partial frame, often called a subframe, and then is assembled to the body. A subframe provides benefits to production in that subassemblies can be made which can be attached to the main body when advantageous on an automated assembly line. For example, a subframe subassembly supporting the engine, drive train and/or suspension can be constructed and then attached to the vehicle main body.

In this regard, because suspension lower arms are usually attached to both sides of a subframe, the subframe is sometimes referred to as a suspension frame. Accordingly, the terms "suspension frame" and "subframe" may be used interchangeably throughout this disclosure.

A stabilizer bar (sometimes referred to as a sway bar) can be one element of a vehicle suspension system. The stabilizer bar connects opposite wheels, i.e., left and right wheels, through short lever arms linked by a torsion spring. The stabilizer bar increases roll stiffness (i.e., resistance to roll in turns).

A typical stabilizer bar passes through a bushing that is secured to the vehicle body through a bracket that is bolted to the vehicle body. Typically, two brackets secure the stabilizer bar in place. That is, one bracket secures the stabilizer bar on a left side, while another bracket secures the stabilizer bar on a right side.

With reference to FIG. 1, a prior art stabilizer bar assembly is depicted. Strut type suspension systems S and S suspend left and right wheels W and W by left and right knuckles 11 and 11 vertically and movably supported on a vehicle body. Knuckles 11 and 11 are supported by suspension arms 10 and 10, dampers 12 and 12 and suspension springs 13 and 13 disposed coaxially on the outer periphery of upper parts of the dampers 12 and 12. A stabilizer bar 14 provides a connection between the upper parts of the left and right knuckles 11 and 11.

The stabilizer bar 14 includes a torsion portion 15 extending linearly in the vehicle width direction, left and right arm portions 16 and 16 extending linearly from opposite ends of the torsion portion 15 toward the rear of the vehicle, and left and right curved portions 17 and 17 providing a smooth transition between the torsion portion 15 and the arm portions 16 and 16. Extremities of the left and right arm portions 16 and 16 are connected to the dampers 12 and 12 via links 22 and 22. Tubular stabilizer bushings 18 and 18 made of rubber are fitted onto opposite ends of the torsion portion 15 adjacent to the left and right curved portions 17 and 17. The stabilizer bushings 18 and 18 are clamped to the vehicle body by a u-shaped mounting bracket 21 fixed by bolts 20 (only one is visible).

The present disclosure provides an improved mechanism for securing a stabilizer bar to a vehicle frame.

SUMMARY

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

According to a first embodiment, a vehicle including a main body and a subframe is provided. The subframe includes at least one recess having an opening side facing the main body. The recess is shaped to receive a bushing having an inner passage configured to receive a stabilizer bar.

According to a second embodiment, a stabilizer bar assembly for a vehicle is provided. The assembly includes a stabilizer bar having opposed ends connected to an a wheel assembly. A first and a second bushing, each having an inner surface that receives the stabilizer bar are disposed within a first and a second recess formed in a vehicle subframe.

According to a further embodiment, an automotive vehicle including a body frame having opposed side frames and a subframe having opposed side members is disclosed. The subframe includes a stabilizer bar connection assembly having a generally U-shaped recess formed in each of the opposed side members and a generally U-shaped bushing disposed within the recesses. The opposed side frames overlie the opposed side members adjacent the recesses and secure the bushings within their respective recess.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated samples, however, are not exhaustive of the many possible embodiments of the disclosure. Other advantages and novel features of the disclosure will be set forth in the following detailed description of the disclosure when considered in conjunction with the drawings, in which.

DETAILED DESCRIPTION

Figure 1:
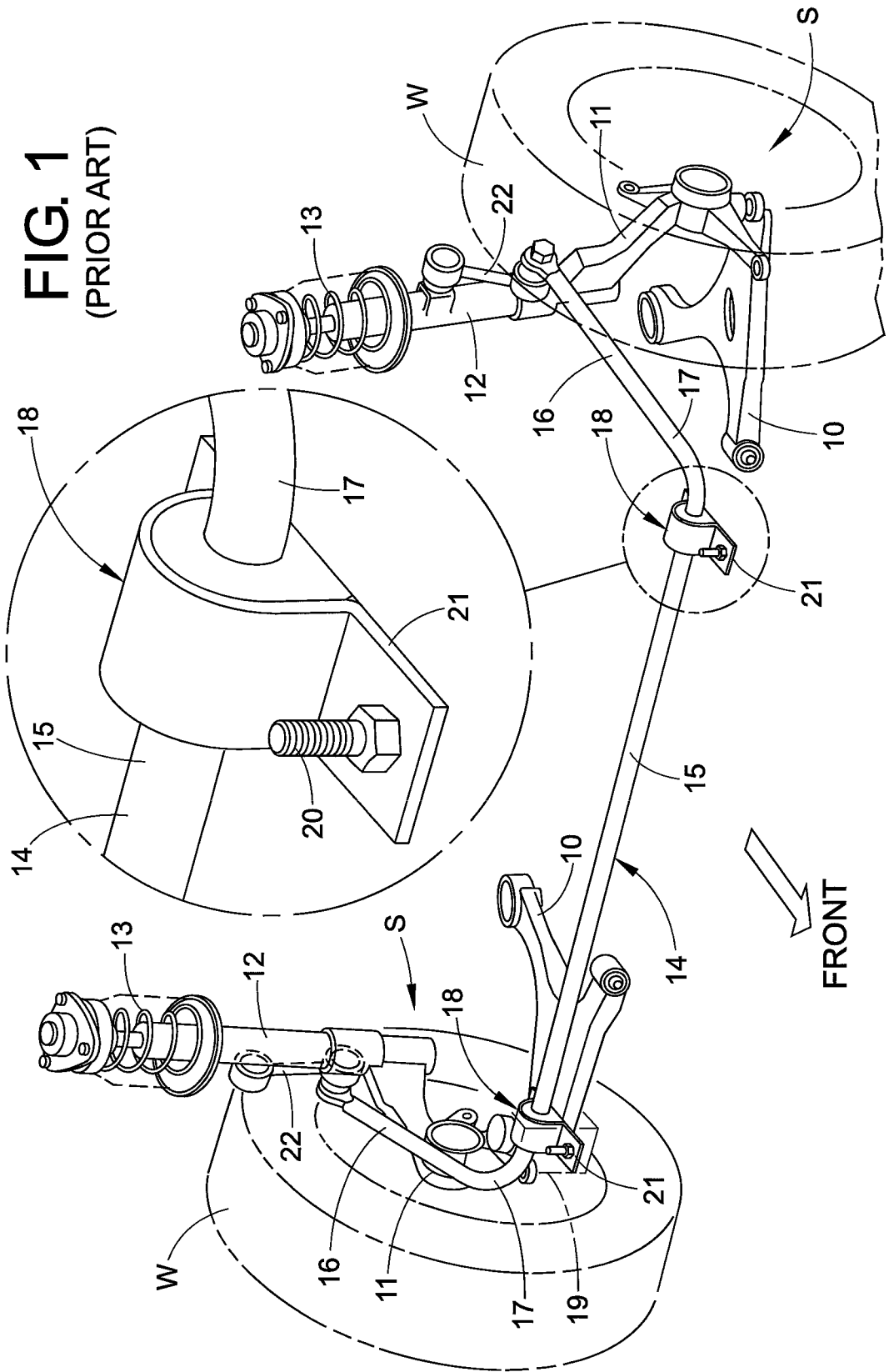
FIG. 1 is a perspective view of a prior art stabilizer bar assembly.
Figure 2:
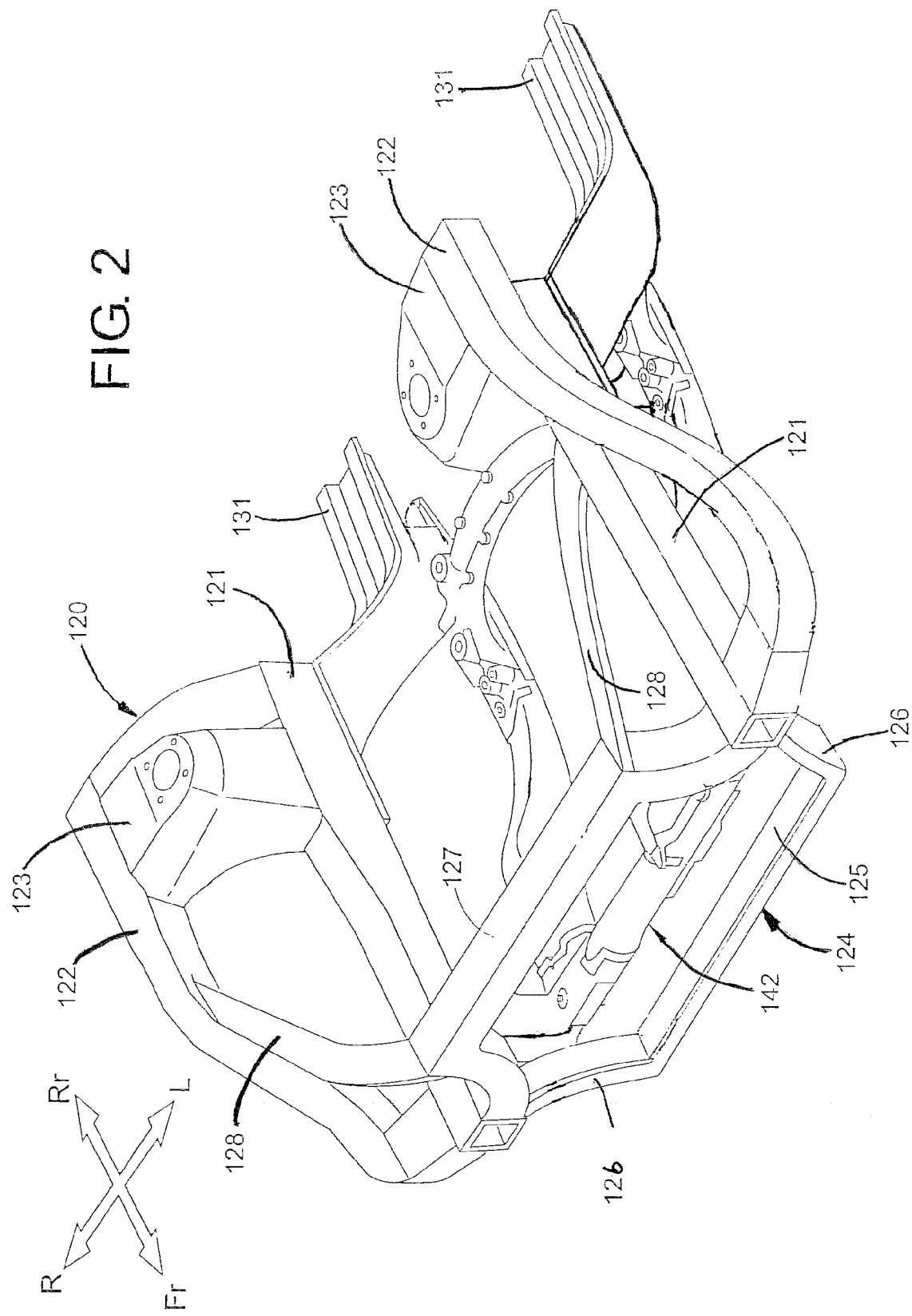
FIG. 2 is a perspective view of a front region of a vehicle body and subframe according to the invention.

Referring now to FIG. 2 a front part of a body frame 120 of a vehicle is depicted. The body is made up of left and right front side frames 121, 121 which extend in a longitudinal direction of the vehicle body on both sides of the front part of the vehicle body. Left and right upper frames 122, 122 lie transversely outside and above the left and right front side frames 121, 121 and extend in the longitudinal direction of the vehicle body. Left and right front damper housings 123, 123 extend between the left and right front side frames 121, 121 and the left and right upper frames 122, 122. A front bulkhead 124 is connected to front portions of the left and right front side frames 121, 121 and front portions of the left and right upper frames 122, 122.

The front bulkhead 124 includes a lower cross member 125 which extends in a transverse direction below the front portions of the left and right front side frames 121, 121, left and right side stays 126, 126 which extend upwardly from both end portions of the lower cross member 125, and an upper cross member 127 which extends in a transverse direction so as to connect upper ends of the side stays 126, 126.

The upper cross member 127 is such that left and right extensions 128, 128 are extended obliquely rearwards from left and right end portions thereof so as to connect to longitudinal intermediate portions of the left and right upper frames 122, 122 via the extensions 128, 128. The body frame 110 can be constructed primarily of extruded metal tubes welded together as required. Exemplary metals include steel, aluminum and aluminum alloys.

A front subframe 142 is suspended from the body frame 120 at the front portions of the left and right front side frames 121, 121 and front end portions of left and right floor frames 131, 131 which extend rearwards, respectively, from rear ends of the front side frames 121, 121. Front subframe 142 can be secured to body frame 120 by bolts, for example.

Figure 3:
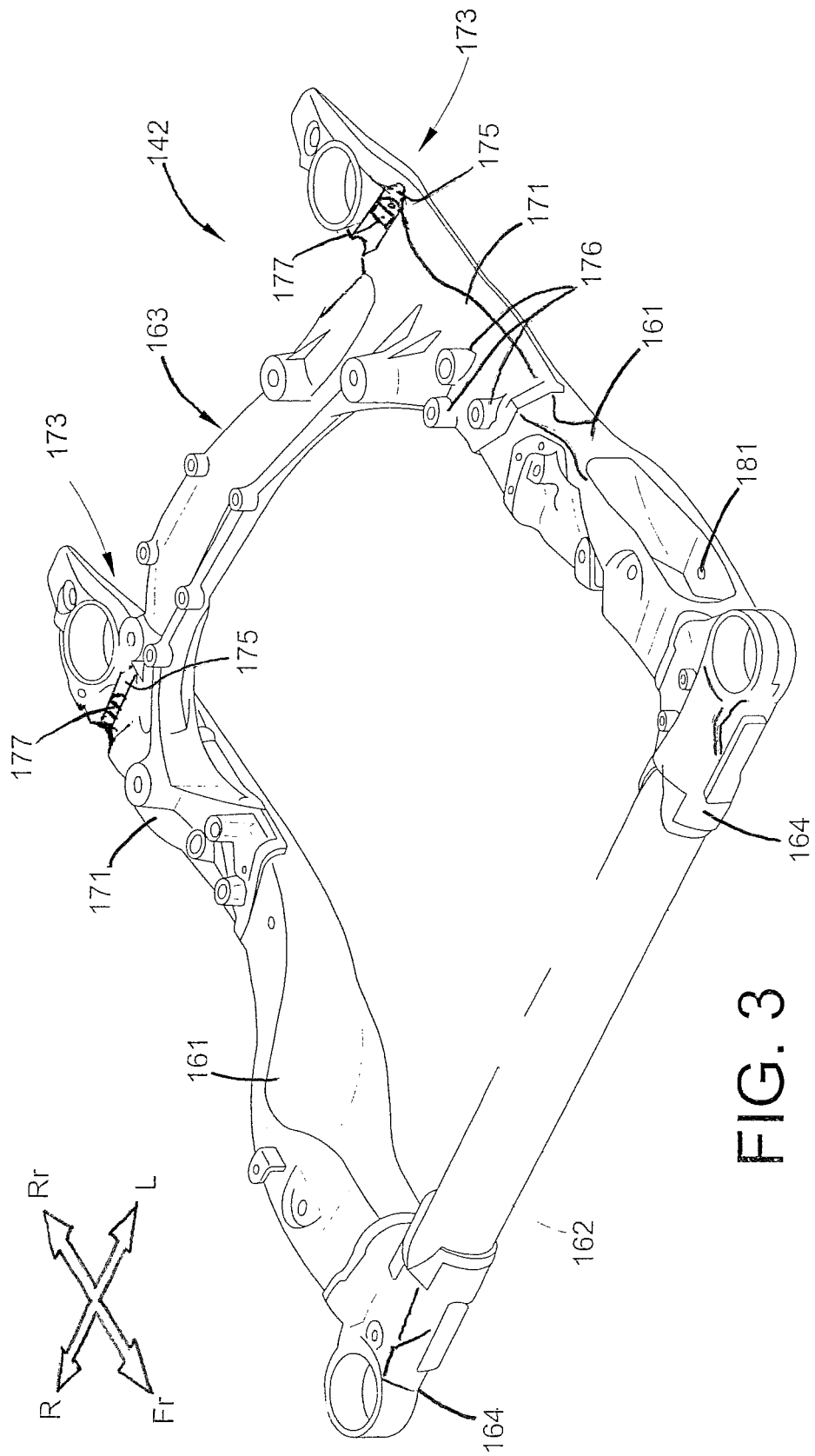
FIG. 3 is a perspective view of the front subframe of FIG. 2.

Referring now to FIG. 3, front subframe 142 is depicted. Front subframe 142 has substantially the shape of a hollow square as viewed from the top thereof. Of course, the subframe can be of any shape or design desired by the skilled artisan. Generally speaking, front subframe 142 can be made up of left and right longitudinal members 161, 161 which extend in the longitudinal direction of the body. A front cross member 162 extends in a transverse direction of the body so as to extend between front ends of the left and right longitudinal members 161, 161. The longitudinal members 161, 161 and the front cross member 162 are inserted into the left and right primary connecting members 164, 164 so as to be joined thereto. A rear cross member 163 extends in the transverse direction of the body so as to extend between rear ends of the left and right longitudinal members 161, 161. Sub-longitudinal members 171, 171 function as connecting members for joining the longitudinal members 161, 161 integrally to both ends of the rear cross member 163 and double as elongating elements to the longitudinal members 161, 161. Metals such as steel, aluminum and aluminum alloys are exemplary materials for construction of the subframe.

Recesses 175, 175 can be formed in body frame mount portions 173, 173 of longitudinal members 171, 171. Recesses 175, 175 are located at body frame mount portions 173, 173 such that portions of the left and right floor frames 131, 131 (see FIG. 2) overlap the recesses 175, 175. Although the recesses 175, 175 are shown at a location where body frame floor frames 131, 131 are mounted, it is envisioned that the recesses can be located at any location on subframe 142 which mates with the body frame 120 in an assembled condition. Moreover, the desired result is an assembled body frame—subframe assembly wherein the body frame overlaps the recess such that a bushing can be retained therein.

Particularly, bushings 177, 177 of a type suitable for receiving a stabilizer bar are positioned within recesses 175, 175 and held in place when body frame 120 is secured to front subframe 142. Recesses 175, 175 are configured to allow lateral access to the bushings 177, 177 such that a stabilizer bar can pass therebetween and outwardly. In that regard, since the stabilizer bar passing through the bushing is simultaneously extending through the subframe, recesses 175, 175 may alternatively be referred to as channels.

Figure 4:
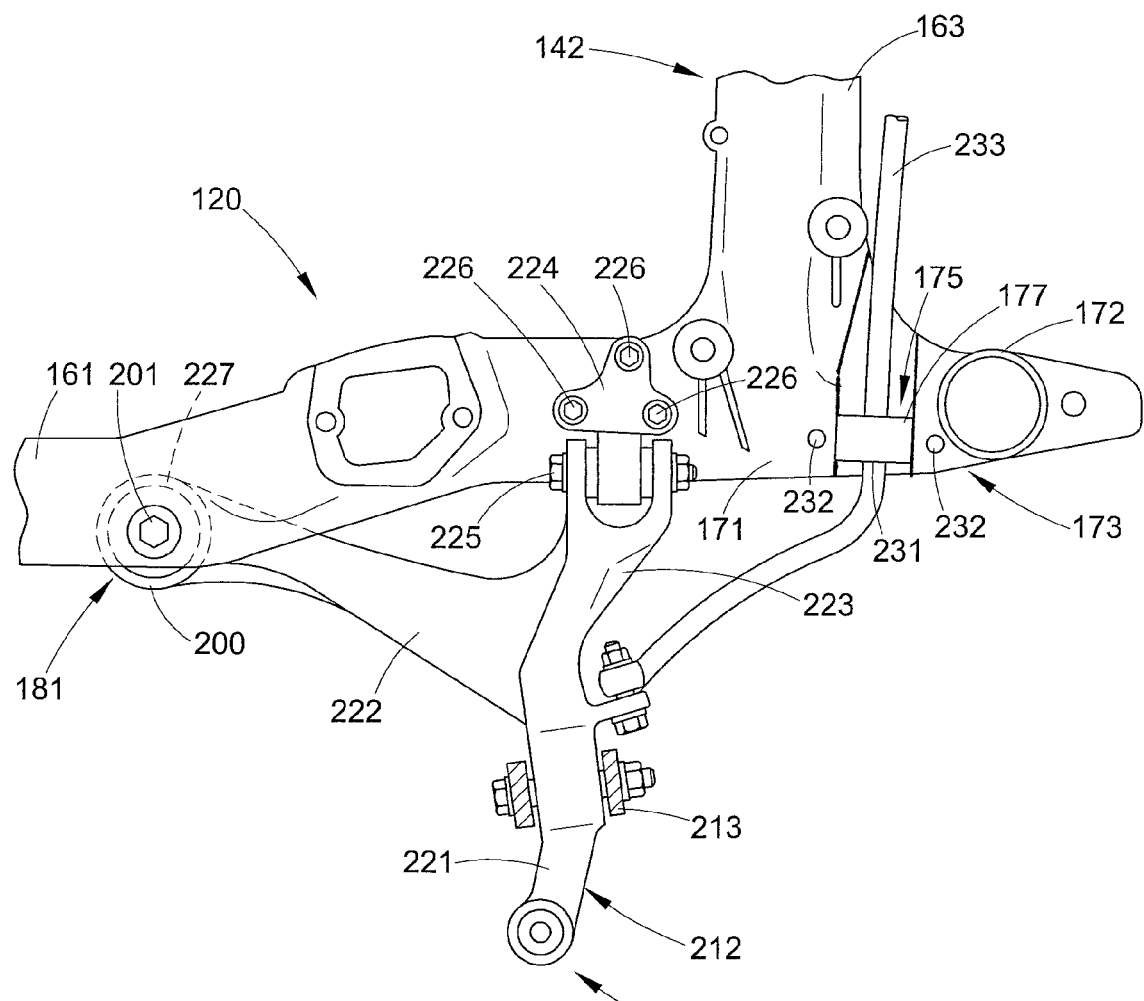
FIG. 4 is a top plan view of the region of the subframe of FIG. 2 where the front stabilizer bar is mounted.

As shown in FIG. 4, left front suspension 210 is a front suspension system which suspends a front road wheel from the body frame 120. A similar right side suspension would also be provided. The suspension 210 includes a lower arm 212 which is mounted on the left longitudinal and sub-longitudinal members 161, 171. A front cushion 213 is mounted between the lower arm 212 and a front damper housing (not shown).

The lower arm 212 is a substantially Y-shaped member as viewed from the top thereof in which a forward-placed front arm 222 and a rearward-placed rear arm 223 are extended from a knuckle connecting portion 221. A distal end portion 227 of the front arm 222 is mounted to a bracket 181 (see FIG. 3) of the longitudinal member 161 via an elastic bushing 200 and a bolt 201. On the other end, a distal end portion of the rear arm 223 is mounted on a rear bracket 224 via an elastic bushing (not shown) with a bolt 225. The rear bracket 224 is mounted to the arm mount portions 176 (see FIG. 3) on the sub-longitudinal member 171 with bolts 226.

The sub-longitudinal member 171 at body frame mount portion 173 includes recess 175 within which stabilizer bar bushing 177 is disposed. Stabilizer bar bushing 177 includes a passage 231 receiving the stabilizer bar 233. Stabilizer bar 233 connects between the left and right lower arms 212 (only the left side is shown) of the front suspension 210.

Bushing 177 is retained in recess 175 when body frame 120 (see FIG. 2) is secured to subframe 142. Particularly, a portion of frame 120 overlaps recesses 175, 175 sealing stabilizer bar bushings 177, 177 therein. To provide a secure mating of body frame 120 to subframe 142 adjacent the bushing 177, subframe 142 can include fastener receiving passages 232, 232. Although body frame mount portion 173 is depicted as a location to receive the stabilizer bar bushings, it is contemplated that any region of the subframe that mates with the body frame is a feasible location for positioning the stabilizer bar bushings.

Figure 5:
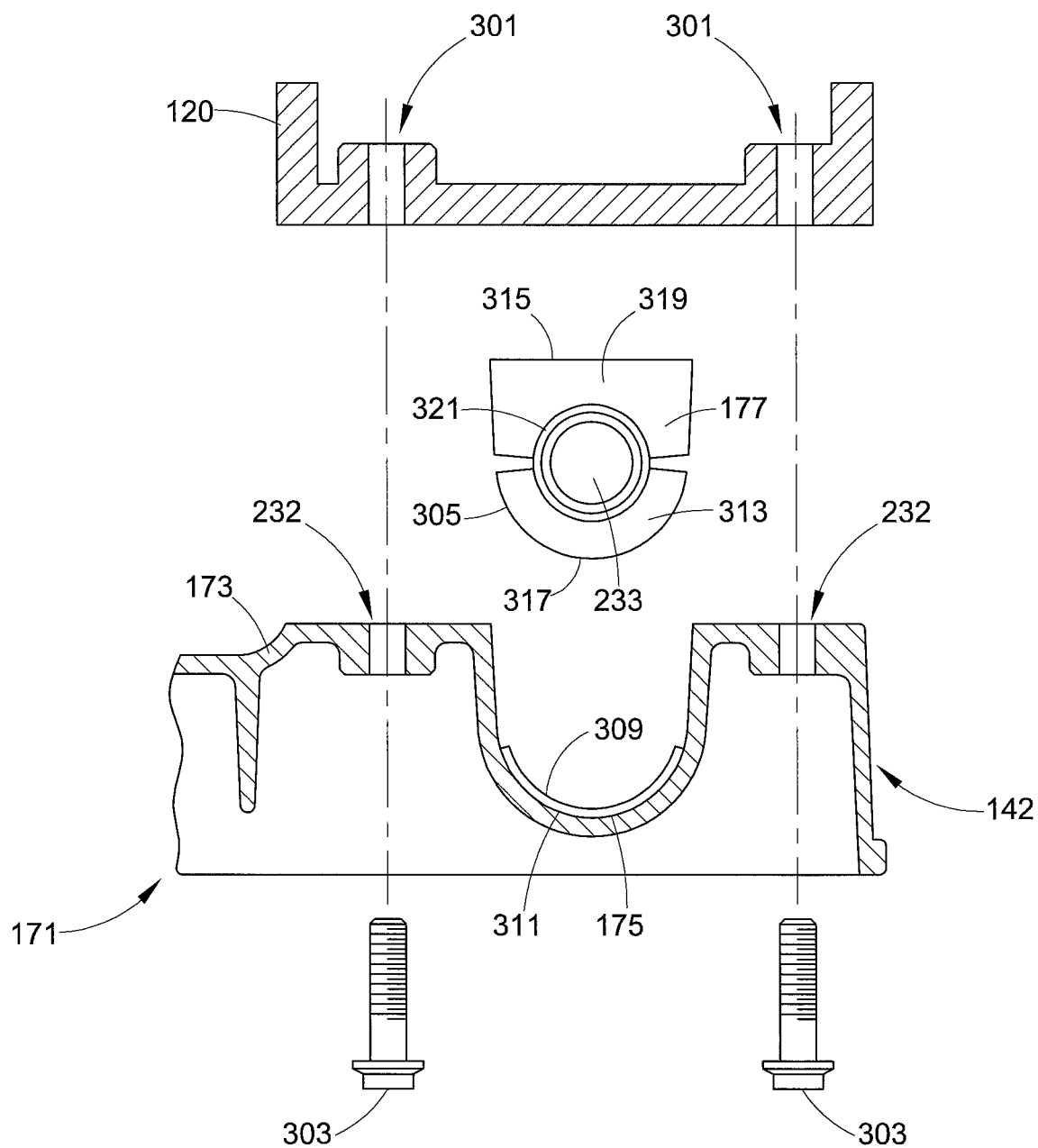
FIG. 5 is an exploded schematic illustration of the present invention.

Turning now to FIG. 5, body frame mount portion 173 of sub-longitudinal member 171 is shown. Recess 175 is shown as substantially U-shaped in cross section. Stabilizer bar bushing 177 is similarly shown as substantially U-shaped in cross section. Of course, any cooperatively shaped surfaces are contemplated.

Body frame 120 is shown in alignment with body frame mount portion 173 and the skilled artisan can envision how in an assembled condition, body frame 120 will overlap stabilizer bar bushing 177 and secure it within recess 175 in subframe 142. Body frame 120 includes passages 301 designed to overlap with passages 232 in body frame mount portion 173. Mating of body frame 120 to body frame mount portion 173 with fasteners 303 extending through passages 232 and 301, respectively secures stabilizer bar bushing 177 within recess 175. Any type of fastener such as bolts, screws, clips, etc. may be used.

Bushing 177 may be provided with a recessed surface 305 shaped to receive a projection 309 from an inner wall 311 of recess 175. The interlocking of the projection 309 and recessed surface 305 can prevent the lateral motion of the bushing 177 as stabilizer bar 233 travels therethrough. Similarly, the projection could be located on the bushings and the recess on the inner wall 311. Alternatively, recess 175 could include raised edges that engage the sidewall 313 of stabilizer bar bushing 177 to prevent lateral motion thereof. The raised edges should only extend to a height that does not interfere with the lateral access of the stabilizer bar to the inner passage of the stabilizer bar bushing 177.

Each stabilizer bar bushing 177 includes a flat first outer peripheral face 315, a second outer peripheral face 317 with a U-shaped cross-section, a pair of side faces 319, and a circular in cross-section inner peripheral face 321 opening on the two side faces 319 and into which the stabilizer bar 233 is fitted.

The diameter of the inner peripheral face 321 at opposite ends adjacent side faces 319 can be slightly smaller than the diameter of other sections.

The stabilizer bar bushing 177 is secured to the subframe 142 by fitting the U-shaped recess second outer peripheral face 317 into the U-shape recess 175 and abutting the body frame 120 against the flat first outer peripheral face 315. Moreover, the stabilizer bar bushing 177 is clamped between the subframe and the body frame and compressed radially inwardly by a predetermined tightening allowance. Although the depicted embodiment has utilized cooperative U-shaped bushings and recesses, this disclosure contemplates the use of any shaped bushing and recess suitable for retaining the bushing in the subframe via the body frame.

The diameter of the inner peripheral face 321 when the stabilizer bar bushing 177 is in a free state is formed slightly larger (e.g. 0.5 mm) than the diameter of the relevant region of the stabilizer bar 233 so that when it is compressed radially inward by the body frame 120, the contact surface pressure between the inner peripheral face 321 and the outer peripheral face of the stabilizer bar 233 does not become higher than necessary, yet is sufficiently high to provide intimate contact.

With regard to the stabilizer having the above arrangement, when the left and right wheels W and W move vertically in phase, since the left and right arm portions of the suspension move vertically in phase, the stabilizer bar is not twisted, and a roll moment is not generated, but when the left and right wheels W and W move vertically in opposite phases, since the left and right arm portions move vertically with opposite phases, the stabilizer bar is twisted, and a roll moment for suppressing rolling of the vehicle body is thus generated, thereby enhancing the drivability of the vehicle.

According to the present disclosure, a stabilizer bushing is integrated into the subframe of an automotive vehicle. A pair of subframe-to-body fasteners received by the subframe on opposite sides of the bushing recess connect the subframe to the body wherein the body secures the bushing within the recess. Current stabilizer bar attachment systems require multiple parts and fasteners as well as the associated added assembly steps. The presently disclosed system eliminates 2 excess brackets (1 per side) and at least 4 fasteners (2 per side) resulting in decreased vehicle weight and enhanced assembly efficiency. Furthermore, although a front stabilizer bar assembly is depicted herein, a rear stabilizer bar assembly of a similar design is also contemplated within this disclosure.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A vehicle comprising a main body and a subframe, said subframe including at least one recess having an opening side, said opening side facing said main body, said recess being cooperatively shaped to receive a bushing, said bushing defining an inner passage configured to receive a stabilizer bar.

2. The vehicle of claim 1 wherein said main body and said subframe are comprised of aluminum or aluminum alloy.

3. The vehicle of claim 1 wherein said bushing includes a first surface engaging a wall of said subframe forming said recess and a second surface engaging said main body.

4. The vehicle of claim 3 wherein said first surface is generally U-shaped.

5. The vehicle of claim 3 wherein said second surface is substantially flat.

6. The vehicle of claim 1 including two recesses and two bushings.

7. The vehicle of claim 6 wherein said recesses are located on opposed elongated members of said subframe.

8. The vehicle of claim 1 further including at least one fastener extending between said main body and said subframe adjacent said recess.

9. The vehicle of claim 1 wherein said recess further includes opposed lateral openings.

10. The vehicle of claim 3 wherein one of said first surface of the bushing and the wall of the subframe forming the recess includes a projection and the other a recess receiving the projection.

11. A stabilizer bar assembly for a vehicle comprising:
a stabilizer bar having opposed ends connected to a wheel assembly;
a first and a second bushing, each having an inner surface that receives the stabilizer bar and an outer surface; and
a vehicle subframe, said subframe including a first and a second recess, each of said recesses shaped to receive one of said first and second bushings.

12. The assembly of claim 11 further comprising a vehicle body mated to said subframe, said body contacting said bushings and retaining said bushings within said recesses.

13. The assembly of claim 12 further comprising at least one fastener securing said subframe to said body.

14. The assembly of claim 13 comprising two fasteners disposed on opposed sides of each recess.

15. An automotive vehicle including a body frame having opposed side frames and a subframe having opposed side members, the subframe including a stabilizer bar connection assembly, said assembly comprising a generally U-shaped recess formed in each of said opposed side members, and a generally U-shaped bushing disposed within each of said recesses, said opposed side frames of the body frame overlying said opposed side members of the subframe adjacent said recesses and securing each bushing within the respective recess.

16. The vehicle of claim 15 wherein said bushings include a substantially flat surface engaged by said body frame.

17. The vehicle of claim 15 wherein said assembly further comprises at least one fastener adjacent each of said recesses and connecting said body frame and said subframe.

18. The vehicle of claim 15 wherein said recesses comprise channels extending through a width of said side members of the subframe.

19. The vehicle of claim 18 wherein said assembly includes a means for preventing lateral movement of said bushings.

20. The vehicle of claim 19 wherein said means for preventing lateral movement of the bushings comprises a projection extending from a wall defining said recess.

* * * * *